(No Model.)
W. LANGMUIR.
RUBBER TIRE.
No. 595,486. Patented Dec. 14, 1897.
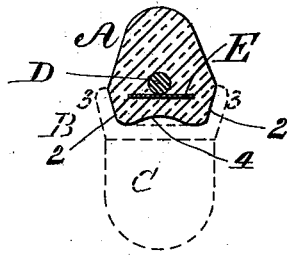
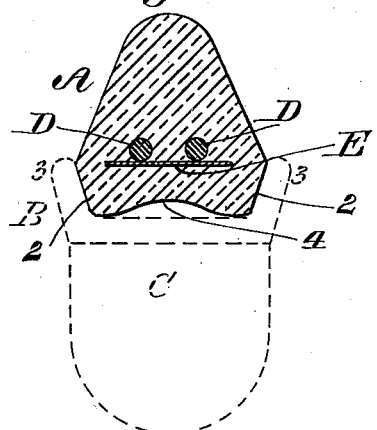
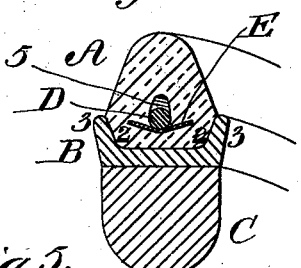
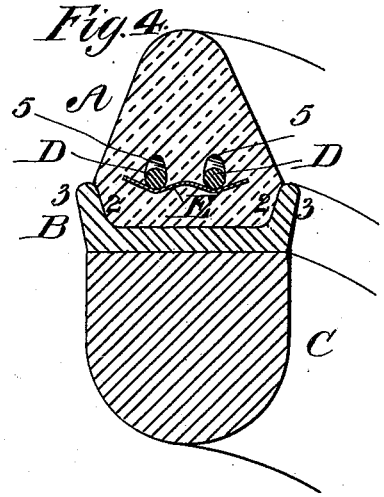
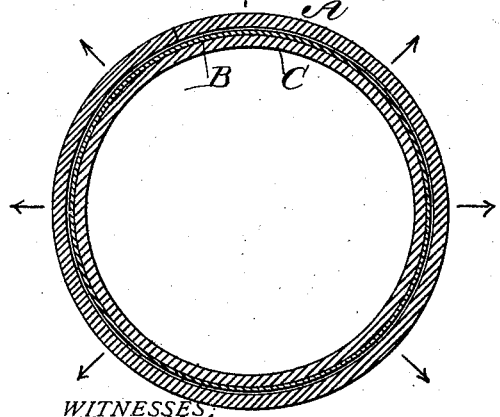
WITNESSES
D. J. Phelan
L. Jackson
INVENTOR.
Woodburn Langmuir,
BY Henry F. Parker.
ATTORNEY.

UNITED STATES PATENT OFFICE.

WOODBURN LANGMUIR, OF TORONTO, CANADA.

RUBBER TIRE.

SPECIFICATION forming part of Letters Patent No. 595,486, dated December 14, 1897.

Application filed September 10, 1896. Serial No. 605,361. (No model.)

*To all whom it may concern:*

Be it known that I, WOODBURN LANGMUIR, a subject of the Queen of Great Britain, and a resident of Toronto, Province of Ontario, Canada, have invented certain new and useful Improvements in Rubber Tires, of which the following is a specification.

My invention relates to rubber tires for vehicles in which the rubber tire is placed upon a channeled rim of metal or other material, and it is desirable that the rubber should be firmly and permanently secured to the rim.

Heretofore it has been the practice to cover and protect the base of the rubber with canvas and to bind the rubber into the channel by means of wires running longitudinally through the rubber. The rubber is molded in a strip, the longitudinal holes being molded by rods supported in the mold. When the tire is applied to the channeled rim, the wires are inserted into the holes in the rubber and the latter is placed in position and compressed lengthwise in the channel sufficiently to separate the ends and allow the wires to be welded or joined, the rubber then being allowed to expand until its ends meet, the same being cemented. The tire is thereby firmly attached when new; but after it has been used for some time, especially on rough stony roads, it is known to wear loose in its channel, and by reason of its tendency to expand outward and to spring away from the rim it will leave a gap at the joint between the rubber and the channel, admitting water, grit, and foreign substances, and the tire soon begins to creep or revolve lengthwise around in its channel, rapidly wearing away at its base, shortening the life of the tire, and requiring frequent repairs. Moreover, the wires impinging directly into the body of the rubber compress only a small portion thereof and offer little resistance to the outward expansion of the body, and as soon as the wear begins the body of rubber between the wires and the bottom of the channel loses its compression and density, which relaxation is known to allow more rapid deterioration, both chemically and mechanically. The water and foreign matter soon find their way also into the wire-holes and further destroy the tire, and the wires become rusted and break.

The object of my invention, therefore, is to so thoroughly incorporate or integrate the rubber tire with the channel-rim in the first instance that there shall be no chance for the rubber to part from its seat in the channel or to move or revolve in its seat, and that the rubber shall adhere throughout its inner surface or base to the channel and shall preserve its compressed state between the binding-wires and the channel, and that the compression shall be equally distributed and preserved throughout that portion of the rubber lying between the wires and the channel and so that the force of contraction of the inside of the tire shall exceed the tendency of the whole body of rubber to expand outward by the end compression aforesaid, thereby insuring a firm and permanent adhesion of the tire to the channel irrespective of the use of cement and holding the tire securely in place until its exterior surface is entirely worn out.

My invention consists in vulcanizing or incorporating into the structure of the rubber a diaphragm or longitudinal strip of inelastic or comparatively inelastic material between the binding-wires and the base, adapted to receive and distribute the pressure of the wires over the rubber, so that the wires may be drawn tighter through the tire than has heretofore been possible without danger of cutting or compressing the rubber unevenly in ridges, and whereby the base of the rubber will be wholly and uniformly compressed into intimate contact with the rim both at the sides and at the bottom of the channel. The use of a canvas facing at the base of the tire is thereby rendered unnecessary, creep and wear at that point being entirely done away with, and when cemented the natural elastic surface of the rubber will adhere much more firmly to the metal surface of the channel than a canvas face.

Referring to the accompanying drawings, Figure 1 represents a cross-sectional view of a single-wired tire before being bound in the rim, and Fig. 2 represents the same bound into the rim. Fig. 3 represents a cross-sectional view of a double-wired tire before being bound in the rim, and Fig. 4 represents the same bound into the rim. Fig. 5 represents a side sectional elevation of the tire on a reduced scale, illustrating the defects heretofore existing.

In the several views, A represents the rubber body or tire; B, the channeled rim, of metal, and C the felly of the wheel.

D in Figs. 1 and 2 represents a single binding-wire, and D D represent double binding-wires in Figs. 3 and 4.

The rim B is provided with flanges 3 3, forming a channel between, and in this channel it is sought to securely and permanently embed the tire A.

The tire A is preferably concaved at its base, as shown at 4 in Figs. 1 and 2, with an ogee or reverse curvature in its normal cross-sectional contour.

The flanges 3 3 are preferably beveled or diverged, as shown, to receive corresponding beveled faces 2 2 of the tire, tending to promote compression of the rubber under the wires when the tire is tightened inward.

E represents the inelastic flexible strip or diaphragm incorporated into the rubber by vulcanizing or otherwise and running longitudinally throughout the length of the tire. This strip is composed of canvas, or it may be composed of leather, which should be perforated, thereby allowing the tire to be contracted longitudinally when being applied to the rim. The perforations in the leather will also admit the rubber into them giving greater holding power.

In applying the tire the wires D D are inserted through the holes therefor in the rubber, and the strip or tire A is laid in the channel-rim B and the ends are forced back until the wires are united with proper tension, and the ends of the rubber are then allowed to compress together and are cemented. There still remains a considerable stored force of compression lengthwise in the rubber, the tire being made longer than the circumference of the rim B in order that the rubber may be better preserved in a compressed state in all parts of its body and in order that the ends may not part where they abut. Consequently there is a tendency for the rubber to jump away from the rim, as indicated in Fig. 5, and this tendency has heretofore caused the tire to loosen and creep and wear out by internal friction on the rim long before the outer surface has worn out, also admitting foreign substances at the sides and base of the rubber, rapidly degenerating the tire. In order to remedy this evil, it is essential that the wires D D be drawn so tight that the outward spring of the tire shall be more than counteracted, and this has been heretofore imperfectly accomplished owing to the fact that by binding the wires too tight they would compress the rubber excessively at one point immediately beneath each wire, leaving the rest of the inner body of rubber comparatively free to push away from the rim and leave gaps. Such excess of pressure has been found to cut the rubber or soon cause the inside surface to wear away at the compressed point or line, so that the inward tension of the wires is lessened and lost, and having lost their tension the wires are inclined to crystallize and break. In order to permit the proper contraction of the wires, I employ means for effecting a practically even distribution of the pressure of the wire or wires throughout the lower cross-section of the rubber or base of the tire. The diaphragm E serves this purpose, and, being interposed immediately beneath the wires, will when the wires are contracted against the same, as in Figs. 2 and 4, draw the surrounding body of rubber together into the channel by reason of the firm adhesion of the diaphragm to the rubber, thus compressing the inner body powerfully against the rim. The hollow base shown in Figs. 1 and 3 then assumes the form shown in Figs. 2 and 4, respectively, and the entire surface of the base adheres evenly. The convergence of the flanges 3 3 toward the bottom of the channel further tends to compress the rubber together and insure a close joint at the sides as well as at the base. By the increased amount of strain allowed on the wires enlarged spaces occur at 5 5, Figs. 2 and 4, and these spaces or hollows increase in a measure the elasticity of the tire and are therefore desirable. The lateral compression of the rubber effected by the canvas at each side of these holes when the wire is drawn down prevents lateral expansion of the holes, and consequently resists vertical compression.

Canvas facing is omitted at 4, and the rubber when cemented directly to the metal adheres permanently throughout the cross-section of its base, so that side thrust of the wheels on the ground in turning corners will not start a gap. The compressed condition of the base is also advantageous in using cement for the reason that the rubber, if in its natural state, uncompressed, would have a tendency to contract with age and thus become separated from the cement. Rubber will cement more perfectly to steel than will canvas.

The diaphragm or strip E may be made the full width of the tire, but is preferably inserted a part of the width, leaving integral external walls of the rubber and being sufficient in area to distribute the bearing of the wires against an additional volume of rubber in the base. When the tension is applied to the wires, the width of the diaphragm substantially covering the arch 4 will cause the arch to close inward from the base of the walls toward the center of the arch, rendering the entire base in a compressed state. The base of the tire is thereby longer lived than if it were in its natural state, there being an extra amount of rubber to make up for the natural waste due to the chemical change which takes place.

Having thus fully described my invention, what I claim, and desire to secure by Letters Patent, is—

1. The combination with a channeled rim having flanges which confine the base of the tire, of a rubber tire adapted when in a longitudinally-compressed state to fit the circumferential length of said rim and having one or more longitudinal wire-holes located above or substantially on a line with the outer edges of the flanges of the rim so as to contain a radially and laterally compressible mass of rubber within the circle of the wire, a longitudinal adhering band incorporated in the tire across the bases of said holes, and one or more holding-wires extending through said holes around the circumference of the tire and contracted upon said band to a circumferential length whereby the adjacent body of rubber at the sides and base of the tire is massed and compressed by means of said wires and band into said channeled rim with force exceeding the radial expanding tendency produced by said longitudinal compression of the tire and intimately uniting the surface of the rubber with the whole surface of the rim-channel by mechanical pressure.

2. The combination with a channeled rim having flanges which confine the base of the tire, of a rubber tire having one or more longitudinal wire-holes located above or substantially on a line with the outer edges of the flanges of the rim so as to contain a radially and laterally compressible mass of rubber within the circle of the wire, a longitudinal adhering band incorporated in the tire across the bases of said holes, and one or more holding-wires extending through said holes around the circumference of the tire and contracted upon said band with force sufficient whereby the adjacent body of rubber at the sides and base of the tire is massed and compressed by means of said wires and band into said channeled rim and intimately united with the whole surface of the rim-channel by mechanical pressure.

Signed at New York, in the county of New York and State of New York, this 1st day of August, A. D. 1896.

WOODBURN LANGMUIR.

Witnesses:
J. KENNEDY,
H. F. PARKER.